3,244,552
PROCESS FOR COATING FILM
Gordon W. Thompson, Clinton, Iowa, assignor to E. I. du Pont de Nemours and Company, Wilmington, Del., a corporation of Delaware
Filed Mar. 8, 1961, Ser. No. 94,205
2 Claims. (Cl. 117—67)

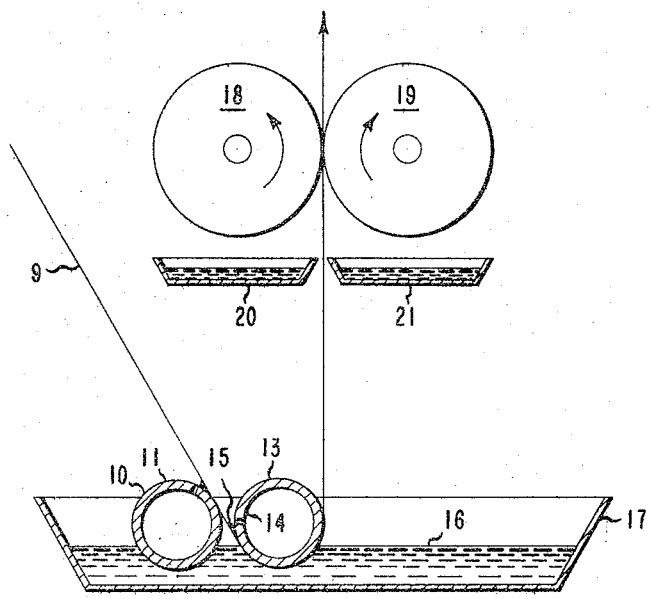

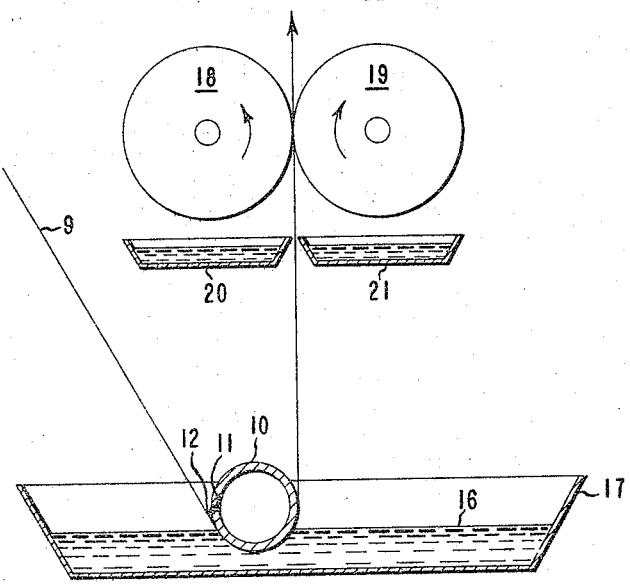

This invention relates to coating organic sheet materials and, more particularly, to a process for coating films, webs and sheets of regenerated cellulose.

Regenerated cellulose sheet material as it comes from the casting machine, possesses properties which limit its utility to ornamental and sanitary protective applications. However, the prior art is replete with coating compositions for the film which serve to make the film commercially more attractive. There are coatings to control the moisture and gas permeabilities of the film, to increase its chemical resistance, to improve its heat-sealability, to impart durability to the film and to improve the surface slip and crease resistance of the film.

The coatings are usually applied from solutions or aqueous dispersions by passing the regenerated cellulose film through a vessel, the dip tank, containing the solution or dispersion. Thereafter, the coated film is passed through a doctoring or smoothing device which regulates the amount of the coating composition left on the film. The coating is then smoothed and the coated film is dried, usually by heating to evaporate the volatile solvent or the aqueous dispersant.

More specifically, the film in the form of a continuous web is led over a guide roll into an ordinary tank containing liquid and in which a rod or a roll or some other guide means is located. The guide roll or the like is submerged in the liquid in the tank and the film web is led around it. The web emerges from the tank in a substantially vertical direction and is then led to locations where it is heated and dried. Prior to leaving the dipping location, the web is passed through the nip of doctor rolls to remove excess coating liquid. The doctor rolls may be located below, at or above the surface of the liquid in the tank.

The above-described dip coating proceed operated successfully for many years (refer to U.S. Patent No. 1,826,697, issued October 6, 1931). However, with the advent of high-speed casting, i.e. 100 yards/minute and above, and the accompanying necessity of coating in a continuous process at similarly high speeds, important problems have arisen. Since it is necessary to submerge the film in the coating bath to an appreciable depth to insure sufficient pickup of coating liquid on the film, particularly at high speeds, and since coating baths are usually viscous, it is necessary to apply considerable force to the film to overcome the resistance offered by the coating bath to the movement of the film through the bath. Of necessity, the tension on the film increases sharply as the coating speed increases. With the increased tension on the film being coated, there is a tendency for the film to break at any weak point along the edge of the film. Each film break during the process results in the loss of several pounds of film as waste and reduces the productivity of the particular machine and its operator. In short, film breaks add considerably to the cost of producing commercially useful film. In actual practice, the maximum speed at which the process can be run is determined by the film-break frequency which, in turn, is a function of the force that must be applied to the film.

It is, therefore, an object of this invention to provide a process that permits coating film continuously at relatively high speeds in a commercially feasible manner. It is another object to provide such a continuous process for coating film while placing the film under only reasonable tension. Other objects will appear hereinafter.

The objects are accomplished by coating a travelling web of film using means disposed in air or partially submerged in a bath containing coating liquid adapted to guide a travelling web of film therearound; means adapted to feed coating composition liquid continuously to the two-sided pocket formed by the web approaching the guide means and the guide means; and means disposed above the guide means adapted to regulate the amount of coating composition liquid on the surface of the web of film. It will be noted that whether the guide means is disposed in air or is partially submerged in a bath, the pocket is disposed in air.

The process involves bringing the uncoated web into contact with a supporting surface, feeding coating composition liquid into the pocket formed by the web approaching the supporting surface and the supporting surface and, thereafter, leading the coated web away from the supporting surface at a point substantially 90° or more from the pocket to provide a brushing of the coating liquid onto the surface beyond the pocket and to lubricate the surface, and doctoring then smoothing the coating composition on the surface of the web.

The process of this invention, which might be referred to as a "buttering" process for coating film, is rather flexible since it can be used to coat either one or both sides of film or it may be used in combination with the immersion coating process. The apparatus used in carrying out the process of this invention also offers considerable flexibility, since the necessary components may be arranged in many different ways, several of which are shown in the accompanying drawings.

In the drawings:

FIGURES 1 and 2 are each diagrammatic elevations of embodiments of apparatus for carrying out the process of the invention.

Referring to the drawings, the film and each component of apparatus are numbered in each drawing so that the same number is used to designate a particular item appearing in the drawings. FIGURE 1 shows a preferred arrangement of the components of the apparatus and will serve to illustrate the improved coating process of this invention. In this arrangement, the coating bath is applied to the top surface of the film through tube 13 while the coating bath is applied to the bottom of the film by immersing it in the main body of the bath 16 after the bottom surface has been prewet with bath supplied through the tube 10. Only a relatively small amount of bath is needed to prewet the bottom surface of the film, since it will later pick up excess bath on being immersed. Prewetting the film with bath through tube 10 does not require the formation of a continuous pool of bath along the line of contact of the film and the tube. Hence, since no appreciable wrap is necessary, tube 10 need only make slight contact with the film. Specifically, a continuous web of film 9 is passed into the coating compartment and contacts the first "buttering" tube 10 through which excess bath is supplied to the bottom surface of the film through a slotted opening 11 in a line along the length of the tube. The bath may be carried to the interior of the enclosed hollow tube by means of a pump through a pipeline from tank 17. The tube is positioned transversely to the film and in a manner such that the opening 11 in the tube is inclined toward the oncoming film at an angle of approximately 30° with respect to the perpendicular from the film to the center of the tube 10.

The film then passes downwardly until its upper surface makes contact with a second "buttering" tube 13 which is positioned transversely to the moving film. Excess coating bath is supplied to the upper surface of the film through the slot opening 14 along the length of the second "buttering" tube 13. The opening 14 in the second tube is also disposed at an angle of about 30° with respect to a perpendicular from the film to the center of the tube 13. The film then passes around the second tube 13 with sufficient wrap to cause a continuous pool of bath 15 to deposit in the pocket formed by the film approaching tube 13 and the curved surface of tube 13. All of the coating bath applied to the top surface of the film is carried by the film into the pool 15 then passes between the film and tube, during which passage the bath is "brushed" uniformly onto the film while serving as a lubricant to reduce the friction between the film and second tube 13. As the film breaks contact with the second tube, substantially all of the bath applied to the upper surface of the film remains on the film as a continuous, relatively uniform layer across the width of the film. Any bath that might drip from the film or from the two "buttering" tubes during the "buttering" operation will fall into the main body of coating bath 16 contained in the supply tank 17 located at the bottom of the coating compartment.

After leaving the second tube 13, the film passes upwardly between two doctor rolls 18 and 19 which remove the excess coating bath from both sides of the film. The doctor rolls are disposed above and substantially parallel to the two tubes 10 and 13 and are positioned relative to the second "buttering" tube 13 so that the film leaving the second tube will approach the doctor rolls in a plane approximately perpendicular to the plane of the axes of the doctor rolls. The excess coating bath drips down into the two "splash" pans 20 and 21 located below the doctor rolls 18 and 19 and may be returned to the main body of coating bath 16 contained in tank 17 through a pipe. Make-up bath is fed into tank 17 by means not shown.

This invention may also be used as illustrated in FIGURE 2. When this combination coating process is used, film 9 is passed down and around a "buttering" tube 10, the bottom of which is slightly below the level of the main body of coating bath 16 contained in tank 17. The extent of immersion of the film is sufficient to wet the bottom surface of the film but not the top surface. Excess coating bath is supplied to the top surface of the film through the slot 11 in the tube 10. The film then passes up through the doctor rolls 18 and 19 causing sufficient wrap around the tube 10 to allow a continuous pool of bath 12 to form in the pocket between the film and tube 10.

When used as illustrated in FIGURE 2, the combination "buttering"-immersion coating process works satisfactorily at low coating speeds, but at high coating speeds there is often excess foaming of the coating bath and occasionally some of the foam will be carried with the film and cause smears on the bottom surface of the coated film. This difficulty may be avoided by prewetting the bottom surface of the film with coating bath just prior to its entrance into the main body of coating bath as described in U.S. Patent 2,865,786.

The "buttering" tubes of this invention are preferably straight tubes having a length greater than the width of the film to be coated and having a substantially continuous, narrow slotted opening parallel to the longitudinal axis of the tube, which opening has a length equal to the width of the film. The opening in the tube should be inclined at an angle toward the oncoming film to prevent the film from contacting either edge of the opening and to allow space for a pool of bath to form along the line of contact of the film and the tube. The magnitude of this angle should be such that substantially all of the coating bath passing through the opening will be caused to pass between the film and the tube. In general, any angle up to about 30° is satisfactory. However, in some instances the particular direction of travel of the film will permit a much greater angle to be used satisfactorily. For example, if the film approaches the "buttering" tube vertically downward, then an angle of as much as about 80° might be used.

Since one of the main objects of this invention is to provide a process for coating film under reduced tension, it is desirable to position the "buttering" tubes relative to each other, to the oncoming film and to any guide rolls being used, so that the wrap around each tube will cause build-up of a pool of bath between the film and the tube, yet will not substantially increase the resistance to the travel of the film. It has been found that the optimum positioning of the tube relative to the film to produce the wrap to cause the required pool of bath depends somewhat on the viscosity of the bath being used. In general, more wrap is required when a high viscosity bath is being used than is necessary when a low viscosity bath is being used. Hence, if the coating operation will entail coating films with different coating baths at different times, it is desirable that a means be provided to make the guide tubes easily adjustable for optimum performance under the specific conditions used.

It should be pointed out that the success of this invention depends upon using sufficient wrap around the "buttering" tubes or the like to cause a pool of bath to form between the film and the "buttering" tube. If this is not met, foam will be generated as the coating bath contacts the film, thus causing smears on the resulting coated film. Apparently, a pool of bath between the "buttering" tube and film prevents foaming of the bath by preventing air from passing along with the film when it contacts the "buttering" tube.

It will be noted that the pool of coating liquid in the pocket or envelope formed by the guide or supporting surface and the web approaching the surface is most easily provided from the interior of the guide, i.e. with so-called "buttering" tubes. However, this should not be considered limitative. It is also possible to provide this pool of liquid by bringing liquid from outside the guide to the aforementioned pocket. Thus, in all cases where the pool can be maintained by gravitational force, one need only provide a liquid at no appreciable pressure through a pipe or similar duct leading to the pocket. However, where gravitational force will tend to dissipate the pool, it may be necessary to spray or jet the liquid on the surface of the film immediately prior to the contact of the film with the guide. It is also possible to use a hollow bar having one curved surface, provided with a suitable opening or a series of openings.

The amount of coating bath left on film being coated by the process of this invention may be controlled by a set of doctor rolls as shown in the figures. However, doctor knives or any of the other known devices commonly used for this purpose may also be used. Likewise, the shape and location of such components as the "splash" pans and coating bath tank may be varied widely; or these items might be omitted altogether in certain instances.

The process of this invention is particularly applicable in the coating of regenerated cellulose film with lacquer-type moisture-proofing coating compositions; i.e. compositions comprised of nitrocellulose or an equivalent film-former, wax, resin, etc., dissolved in volatile organic solvents, e.g. an ethyl acetate-toluene mixture. This invention, however, is generally applicable in the coating of any film or fabric, i.e. porous or non-porous sheets, with any of the polymer solutions or dispersions commonly employed for coating film or fabric.

*Example*

A test was run to evaluate the performance of the coating process of this invention as compared to the known immersion coating process. During the test 223,000 pounds of regenerated cellulose film was coated with a nitrocellulose lacquer composition similar to those shown in U.S. Patent 2,236,546 using the arrangement shown in FIGURE 1 at a speed of 350 yards/minute. As a control, the same amount of regenerated cellulose film was coated with an identical composition using the dip or immersion coating process illustrated in U.S. Patent 2,865,786 at a speed of only 300 yards/minute. Despite the higher speed, the arrangement of the invention produced a film-break frequency that was 27% less than that encountered in the control and an amount of substandard film that was 18% less than the amount obtained in the control.

What is claimed is:

1. A process which comprises bringing an uncoated surface of a continuously moving web of film into contact with a stationary cylindrical supporting surface, said supporting surface being partially submerged in a bath of coating composition liquid; feeding coating composition liquid into the pocket formed by the web approaching the supporting surface and the supporting surface to form a substantial pool of coating composition liquid in said pocket; leading the coated web away from the supporting surface at a point substantially 90 degrees or more from said pocket to provide a brushing of the coating liquid onto the surface beyond the pocket and to lubricate said surface; and doctoring the coating composition on the surface of the web.

2. A process which comprises bringing an uncoated surface of a continuously moving web of regenerated cellulose film into contact with a stationary cylindrical supporting surface, said supporting surface being partially submerged in a bath of coating composition liquid; feeding coating composition liquid into the pocket formed by the web approaching the supporting surface and the supporting surface to form a substantial pool of coating composition liquid in said pocket; leading the coated web away from the supporting surface at a point substantially 90 degrees or more from said pocket to provide a brushing of the coating liquid onto the surface beyond the pocket and to lubricate said surface; and doctoring the coating composition on the surface of the web of regenerated cellulose film.

References Cited by the Examiner

UNITED STATES PATENTS

| | | | |
|---|---|---|---|
| 952,135 | 3/1910 | Pease et al. | 118—412 |
| 979,781 | 12/1910 | May et al. | |
| 1,391,281 | 9/1921 | Snyder | 118—407 |
| 2,257,113 | 9/1941 | George | 118—407 X |
| 2,464,771 | 3/1949 | Van Guelpen | 118—413 X |
| 2,632,422 | 3/1953 | Elkins | 118—419 X |
| 2,865,786 | 12/1958 | Turik | 117—67 |
| 2,918,896 | 12/1959 | Uhleen | 118—413 X |
| 2,936,733 | 5/1960 | Duggins | 118—419 X |
| 2,993,470 | 7/1961 | Stickel | 118—407 |

FOREIGN PATENTS 3,070    2/1911    Great Britain.

JOSEPH B. SPENCER, *Primary Examiner.*

RICHARD D. NEVIUS, *Examiner.*